(12) United States Patent
Okada et al.

(10) Patent No.: US 10,712,285 B2
(45) Date of Patent: Jul. 14, 2020

(54) THREE-DIMENSIONAL OBJECT INSPECTING DEVICE

(71) Applicant: TORAY ENGINEERING CO., LTD., Chuo-ku, Tokyo (JP)

(72) Inventors: Tatsuya Okada, Otsu (JP); Chisa Inaka, Otsu (JP)

(73) Assignee: TORAY ENGINEERING CO., LTD., Tokyo (JP)

( * ) Notice: Subject to any disclaimer, the term of this patent is extended or adjusted under 35 U.S.C. 154(b) by 288 days.

(21) Appl. No.: 15/774,159

(22) PCT Filed: Oct. 26, 2016

(86) PCT No.: PCT/JP2016/081713
§ 371 (c)(1),
(2) Date: May 7, 2018

(87) PCT Pub. No.: WO2017/104271
PCT Pub. Date: Jun. 22, 2017

(65) Prior Publication Data
US 2018/0321161 A1      Nov. 8, 2018

(30) Foreign Application Priority Data

Dec. 14, 2015   (JP) .................................. 2015-243060

(51) Int. Cl.
*G01N 21/88* (2006.01)
*G01B 11/24* (2006.01)
(Continued)

(52) U.S. Cl.
CPC ............ *G01N 21/88* (2013.01); *G01B 11/24* (2013.01); *G01B 21/045* (2013.01);
(Continued)

(58) Field of Classification Search
None
See application file for complete search history.

(56) References Cited

U.S. PATENT DOCUMENTS 5,732,147 A * 3/1998 Tao ...................... B07C 5/3422
348/89
6,072,899 A * 6/2000 Irie ........................ G01B 11/24
348/125

(Continued)

FOREIGN PATENT DOCUMENTS

JP          4-48251 A      2/1992
JP       10-221267 A      8/1998
(Continued)

OTHER PUBLICATIONS

International Search Report of the corresponding International Application No. PCT/JP2016/081713, dated Jan. 17, 2017.

*Primary Examiner* — Kara E. Geisel
*Assistant Examiner* — Jarreas C Underwood
(74) *Attorney, Agent, or Firm* — Global IP Counselors, LLP

(57) ABSTRACT

A three-dimensional object inspecting device for inspecting a three-dimensional object includes a light source, a detector, an orientation information acquisition component, a three-dimensional shading corrector, and an inspection component. The light source emits light energy toward an inspection region set for the three-dimensional object. The detector detects radiant energy radiated from the inspection region. The orientation information acquisition component acquires orientation information about the light source and the detector with respect to the inspection region. The three-dimensional shading corrector performs three-dimensional shading correction on information corresponding to the radiant energy detected by the detector, based on shape information about the three-dimensional object in the
(Continued)

inspection region, the orientation information, and shading correction information for a planar image detected by the detector for each of a plurality of working distances. The inspection component performs an inspection based on the information on which the three-dimensional shading correction has been performed.

14 Claims, 3 Drawing Sheets

(51) Int. Cl.

| | | |
|---|---|---|
| *G01N 21/95* | (2006.01) | |
| *G01B 21/04* | (2006.01) | |
| *G06T 7/00* | (2017.01) | |
| *G06T 7/586* | (2017.01) | |
| *G06T 7/70* | (2017.01) | |
| *G06T 5/00* | (2006.01) | |
| *H04N 5/357* | (2011.01) | |
| *G01N 21/954* | (2006.01) | |

(52) U.S. Cl.
CPC ..... *G01N 21/8851* (2013.01); *G01N 21/9515* (2013.01); *G06T 5/008* (2013.01); *G06T 7/0004* (2013.01); *G06T 7/586* (2017.01); *G06T 7/70* (2017.01); *H04N 5/3572* (2013.01); *G01N 21/954* (2013.01); *G06T 2207/30108* (2013.01)

(56) References Cited

U.S. PATENT DOCUMENTS

| | | | | |
|---|---|---|---|---|
| 6,373,518 | B1* | 4/2002 | Sogawa | G06K 9/03 348/43 |
| 2001/0022853 | A1* | 9/2001 | Takaoka | H04N 1/62 382/167 |
| 2005/0271264 | A1* | 12/2005 | Ito | G06T 5/006 382/154 |
| 2009/0316978 | A1* | 12/2009 | Fujimori | G01B 11/2518 382/144 |
| 2013/0195349 | A1* | 8/2013 | Yamashita | G06T 15/80 382/154 |
| 2015/0125035 | A1* | 5/2015 | Miyatani | B25J 9/1697 382/103 |

FOREIGN PATENT DOCUMENTS

| | | |
|---|---|---|
| JP | 2000-65755 A | 3/2000 |
| JP | 2002-94860 A | 3/2002 |
| JP | 2005-323078 A | 11/2005 |
| JP | 4272438 B2 | 3/2009 |
| JP | 4320990 B2 | 8/2009 |
| JP | 2012-112729 A | 6/2012 |
| JP | 2013-247435 A | 12/2013 |
| JP | 2014-35261 A | 2/2014 |

* cited by examiner

THREE-DIMENSIONAL OBJECT INSPECTING DEVICE

CROSS-REFERENCE TO RELATED APPLICATIONS

This application is a U.S. National stage of International Application No. PCT/JP2016/081713 filed on Oct. 26, 2016. This application claims priority to Japanese Patent Application No. 2015-243060 filed with Japan Patent Office on Dec. 14, 2015. The entire disclosure of Japanese Patent Application No. 2015-243060 is hereby incorporated herein by reference.

BACKGROUND

Field of the Invention

The present invention relates to a device that captures an image of an object with a three-dimensional shape (hereinafter referred to as a "three-dimensional object") and performs an inspection based on the acquired image.

Background Information

Conventionally, when an image is captured in the normal direction or an oblique direction with respect to a plane to be inspected and an inspection is performed based on the acquired image, unevenness of the peripheral light quantity (the so-called shading) is corrected (see Japanese Patent No. 4,272,438, Japanese Patent Application Publication No. 2000-65755, Japanese Patent Application Publication No. 2012-112729, and Japanese Patent No. 4,320,990, for example).

SUMMARY

When the object to be inspected is a three-dimensional object, the intensity of reflected light or scattered light from a location close to the illumination light source and the imaging camera will be different from those from a location far from the illumination light source and the imaging camera. Therefore, at a given position within the field of view of the captured image, if the distance to the object to be inspected is different, the brightness will also be different, and this can affect the inspection result.

With conventional shading correction, if the object to be inspected is formed of a single plane, the distance from the illumination light source and the imaging camera to the inspection portion is constant, so it is possible to obtain the desired inspection result by performing shading correction. Also, even if the object to be inspected is a three-dimensional object, as long as the distance from the illumination light source and the imaging camera to the inspection portion is constant, and the position and orientation of the three-dimensional object with respect to the captured angle of view are constant, the actual distance to the inspection portion will not change for each of the unit pixels within the field of view of the captured image, so it is possible to obtain the desired inspection result by performing shading correction.

However, if the distance from the illumination light source and the imaging camera to the inspection portion varies every time imaging is performed, or if the position and orientation of the three-dimensional object relative to the captured angle of view change every time imaging is performed, then the actual distance to the inspection portion will also change for each of the unit pixels within the field of view of the captured image. Therefore, in a case such as this, a problem is that the proper shading correction cannot be performed, and it is difficult to obtain the desired inspection result.

In view of this, it is an object of the present invention to provide a device with which the desired inspection can be performed by means of shading correction, even when the object to be inspected is a three-dimensional object in which the distance and orientation with respect to the illumination light source and the imaging camera change every time imaging is performed.

In order to solve the above-mentioned problem, one aspect pertaining to the present invention is a three-dimensional object inspecting device for inspecting a three-dimensional object, the device comprising:

a light source that emits light energy toward an inspection region set for the three-dimensional object;

a detector that detects radiant energy radiated from the inspection region;

an orientation information acquisition component that acquires orientation information about the light source and the detector with respect to the inspection region;

a three-dimensional shading corrector that performs three-dimensional shading correction on information corresponding to the radiant energy detected by the detector, based on shape information about the three-dimensional object in the inspection region, orientation information about the light source and the detector with respect to the inspection region, and shading correction information for the planar image detected by the detector for each of a plurality of working distances; and an inspection component that performs an inspection based on information that has undergone the three-dimensional shading correction.

According to this aspect, three-dimensional shading correction can be performed based on three-dimensional shape information about the object to be inspected, orientation information about the detector, and shading correction data about a plurality of planar images having different working distances.

Even with a three-dimensional object in which the distance and orientation with respect to the illumination light source and the imaging camera change every time imaging is performed, it is still possible to perform the desired inspection through shading correction.

DETAILED DESCRIPTION OF EMBODIMENTS

Figure 1:
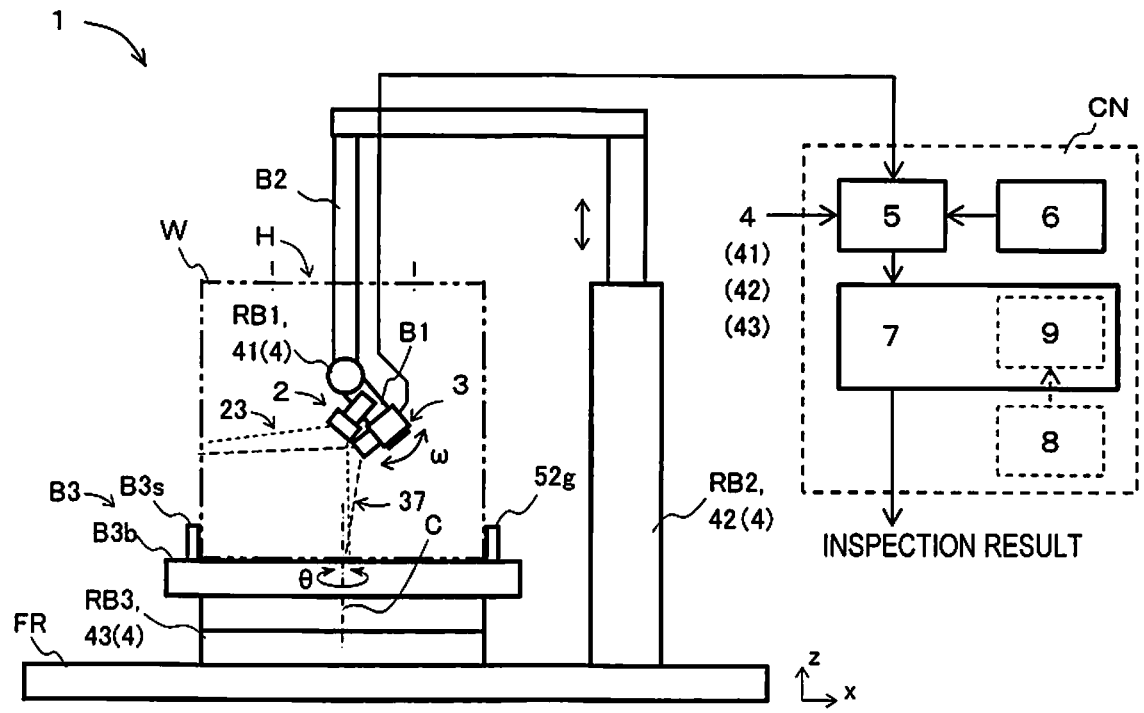
FIG. 1 is a simplified diagram of the overall configuration of an example of a mode for embodying the present invention.

In the following detailed description, a container W having a substantially cuboid shape is used as an example of a three-dimensional object, and inspection of a deposit S adhering to an inner face (or an inner wall face) of the container W using a three-dimensional object inspecting device 1 will also be used as an example. The container W has a substantially cuboid shape made up of four side faces that are taller than they are wide, as well as a top face and a bottom face, and the side faces have a substantially square cross-sectional shape. An opening H is provided in a part of the top face.

In the drawings, the three axes of the orthogonal coordinate system are X, Y, and Z, with the XY plane being the horizontal plane and the Z direction the vertical direction. In particular, in the X direction is such that the arrow points to the right side and the opposite direction is to the left side, the Y direction is such that the arrow points to the rear side and the opposite direction is to the front side, and the Z direction is such that the arrow points to the top side (upward against gravity) and the opposite direction is to the bottom side.

Furthermore, in this description, the bottom face of the container W is disposed parallel to the horizontal plane, and the side faces of the container W are disposed parallel to the Z direction. As to the inner faces of the four side plates of the container W, the left side is termed the first side plate inner face Ws1, the rear side is termed the second side plate inner face Ws2, the right side is termed the third side plate inner face Ws3, and the front side is termed the fourth side plate inner face Ws4 (not shown).

The three-dimensional object inspecting device 1 comprises an illumination component 2, an imaging component 3, an orientation information acquisition component 4, a three-dimensional shading corrector 5, a shading correction information registration component 6, and a deposit inspection component 7.

FIG. 1 is a simplified diagram of the overall configuration of an example of a mode for embodying the present invention, and shows the various components constituting the three-dimensional object inspecting device 1 pertaining to the present invention.

Figure 2:
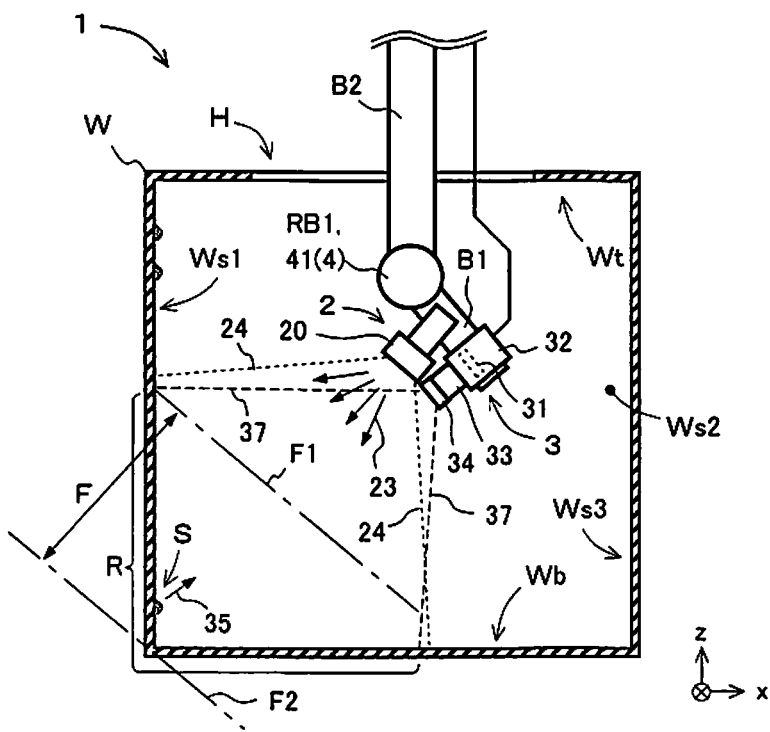
FIG. 2 is a simplified diagram of part of an example of a mode for embodying the present invention.

FIG. 2 is a simplified diagram of part of an example of a mode for embodying the present invention, and shows how an image of a deposit S adhering to the wall face Ws1 of the container W is captured using the three-dimensional object inspecting device 1 pertaining to the present invention.

The illumination component 2 emits excitation light toward an inspection region R on the surface of the container W. More specifically, the illumination component 2 comprises an excitation light illumination unit 20. The excitation light illumination unit 20 emits excitation light 23, which is used for causing the deposit S adhering to the inspection region R to emit fluorescent light, toward the inspection region R. More specifically, the excitation light illumination unit 20 comprises, as a light source, an LED that emits ultraviolet rays as the excitation light 23. The irradiation range of the excitation light 23 is indicated by the broken lines 24.

The imaging component 3 is used to capture light radiated from the deposit S in the inspection region R. More specifically, the imaging component 3 comprises an imaging camera 32, a lens 33, and a fluorescent light observation filter 34.

The imaging camera 32 comprises an imaging element 31, converts light received by the imaging element 31 into an electric signal, and outputs this as a video signal (analog signal) or image data (digital signal) to the outside.

The lens 33 forms an image of the inspection region R on the imaging element 31, and the imaging angle of view is indicated by the broken lines 37. The lens 33 can form an image between the one-dot chain lines F1 and F2, and the area in between becomes the depth of field F.

The fluorescent light observation filter 34 attenuates (reflects or absorbs) the wavelength included in the excitation light 23, and allows the wavelength of the light 35, which is emitted as fluorescence by the excitation light 23, to efficiently pass (or transmit).

The orientation information acquisition component 4 acquires orientation information about the illumination component 2 and the imaging component 3 with respect to the inspection region R. More specifically, the orientation information acquisition component 4 is made up of encoders 41, 42, and 43 of a position angle adjusting mechanism RB.

The position angle adjusting mechanism RB adjusts the relative position and angle of the illumination component 2 and the imaging component 3 with respect to the container W. More specifically, the position angle adjusting mechanism RB includes a linking hand B1, an inclination angle adjusting mechanism RB1, a linking arm B2, a height adjusting mechanism RB2, a container holding table B3, and a rotation angle adjusting mechanism RB3.

The linking hand B1 is used to attach the illumination component 2 and the imaging component 3. Specifically, the linking hand B1 is constituted by a bar, a plate, or the like made from a metal, a hard resin, or the like.

The inclination angle adjusting mechanism RB1 changes the inclination angle of the illumination component 2 and the imaging component 3 with respect to the container W, and holds them at a specific inclination angle. The inclination angle referred to here means the direction indicated by the arrow ω, with the Y direction as the rotation center. More specifically, the inclination angle adjusting mechanism RB1 comprises a rotary actuator, and can move the linking hand B1 in the direction of arrow ω with a gear motor, a pulse motor (not shown), or the like, and stop it at a specific angle. The inclination angle adjusting mechanism RB1 comprises the encoder 41, which outputs a signal corresponding to the current inclination angle or the movement amount.

The linking arm B2 links the inclination angle adjusting mechanism RB1 and the height adjusting mechanism RB2 (discussed below), and moves the illumination component 2 and the imaging component 3 close to the container W, and stops (or holds) them at a specific position and angle. More specifically, as shown in the drawing, the linking arm B2 is constituted by a bar, a plate, or the like made of metal, a hard resin, or the like, linked in an approximate U shape or J shape.

The height adjusting mechanism RB2 changes the position in the height direction (that is, the Z direction) of the illumination component 2 and the imaging component 3 with respect to the container W, and holds them in a specific position. More specifically, the height adjusting mechanism RB2 comprises a linear actuator. The main body of this linear actuator is attached to a device frame FR, and the linking arm B2 is attached to a moving portion that is moved by rotational drive of a rotating motor and a ball screw (not shown). Therefore, the linking arm B2 can be moved in a specific direction (up or down) and stopped at a specific height by rotating the rotating motor in a specific direction and at a specific angle or rotational speed and stopping it at a specific position. The height adjusting mechanism RB2 further comprises the encoder 42, which outputs a signal corresponding to the movement amount or the current position in the height direction of the moving portion of the linear actuator.

The container holding table B3 is used to hold the container W in a specific orientation, and is linked to the rotation angle adjusting mechanism RB3 (discussed below). More specifically, the container holding table B3 comprises a base plate B3b and side plates B3s. The base plate B3b is a part on which the bottom plate of the container W is placed, and is linked to the rotating portion of the rotation angle adjusting mechanism RB3 (discussed below). On the other hand, the side plates B3s are disposed at positions so as to sandwich the side plates Ws1 to Ws4 of the container W from the outside while abutting the side plates, and are attached to the base plate B3b.

The rotation angle adjusting mechanism RB3 changes the rotation angle of the illumination component 2 and the imaging component 3 with respect to the container W, and holds them at a specific rotation angle. The rotation angle referred to here means the direction indicated by the arrow 9, with the Z direction as the rotation center. More specifically, the rotation angle adjusting mechanism RB3 comprises a DD motor. The main body of this DD motor is attached to the device frame FR, and the above-mentioned container holding base B3 is attached to the rotating portion. The rotation angle adjusting mechanism RB3 comprises the encoder 43, which outputs a signal corresponding to the movement amount or the current rotation angle of the rotating portion of the DD motor.

Since the position angle adjusting mechanism RB is configured in this way, the illumination component 2 and the imaging component 3 attached to the linking hand B1 and the container W placed on the container holding table B3 can be moved relatively and can be stopped at a specific angle and position (that is, in a specific orientation).

The orientation information acquisition component 4 acquires and counts signals corresponding to the movement amount or the current value outputted from each of the encoders 41 to 43 of the position angle mechanism RB so that orientation information about the illumination component 2 and the imaging component 3 with respect to the container W will be acquired. More specifically, the relative positions between the initial positions of the illumination component 2 and the imaging component 3 (or the origin positions) and the container W at that point are set and grasped in advance. After this, how far the illumination component 2 and the imaging component 3 have moved from their initial positions is known. Therefore, the orientation information acquisition component 4 can acquire orientation information about the illumination component 2 and the imaging component 3 with respect to the inspection region R at the time of imaging.

The three-dimensional shading corrector 5 performs three-dimensional shading correction on the image captured by the imaging component 3 based on shape information about the container W in the inspection region R, orientation information about the illumination component 2 and the imaging component 3 with respect to the inspection region R, and shading correction information with respect to the planar image captured by the imaging component 3 for each of a plurality of working distances. More specifically, the three-dimensional shading corrector 5 performs image processing on the image captured by the imaging component 3, and is constituted by an image processing device (hardware) and its execution program (software) that are incorporated into a computer CN provided to the three-dimensional object inspecting device 1. The three-dimensional shading corrector 5 is also connected to the shading correction information registration component 6.

The shading correction information registration component 6 is used to register shape information about the three-dimensional object in the inspection region R, orientation information about the illumination component 2 and the imaging component 3 with respect to the inspection region R, and three-dimensional shading correction information for that orientation, that have been predefined. More specifically, shape information about the inner faces of the container W in the inspection region R is registered as the shape information about the three-dimensional object in the inspection region R. Even more specifically, the shading correction information registration component 6 is constituted by a storage device (such as a flash memory, SSD, or hard disk) of the computer CN provided to the three-dimensional object inspecting device 1.

Even more specifically, the three-dimensional shading corrector 5 performs processing as described below, for example.

The shape information about the container W in the inspection region R is acquired based on shape information about the container W and orientation information about the illumination component 2 and the imaging component 3 with respect to the inspection region R. The shape information about the container W is obtained in advance. More specifically, the shape information about the container W can be exemplified by a surface model, which is one type of data defined based on designed CAD data or actual measurement data acquired by three-dimensional measurement. The surface model corresponding to the shape information about the container W is stored in the shading correction information registration component 6.

Meanwhile, the orientation information about the illumination component 2 and the imaging component 3 with respect to the inspection region R is set in advance for a reference position (or the origin position) of the position angle mechanism RB with respect to the container W, and the current value information can be acquired by acquiring and counting the outputs from each of the encoders 41 to 43 accompanying position changes of the illumination component 2 and the imaging component 3.

In separately imaging the side wall inner faces Ws1 to Ws4 of the container W, the container holding table B3 is rotated 90 degrees at a time by the rotation angle adjusting mechanism RB3, but it is difficult to make the rotation center of the container holding table B3 coincide with the center of the container W. Therefore, there is deviation in the distance from the illumination component 2 and the imaging component 3 to the inspection region R of the side plate inner faces Ws1 to Ws4 that are to be imaged. Taking this deviation into account, the difference in the distances from the illumination component 2 and the imaging component 3 to the side plate inner faces Ws1 to Ws4 to be imaged can be ascertained as correction data (so-called offset data), which one of the side plate inner faces Ws1 to Ws4 is being imaged is determined based on the output from the encoder 43 of the rotation angle adjusting mechanism RB3, and the deviation is corrected.

Thus obtaining the shape information about the container W and obtaining the orientation information about the illumination component 2 and the imaging component 3 with respect to the inspection region R allows the shape information about the container W in the inspection region R to be acquired.

Meanwhile, shading correction information for the planar image captured by the imaging component 3 for each of a plurality of working distances is obtained in advance by the following procedure and stored in the shading correction information registration component 6.

Figure 3:
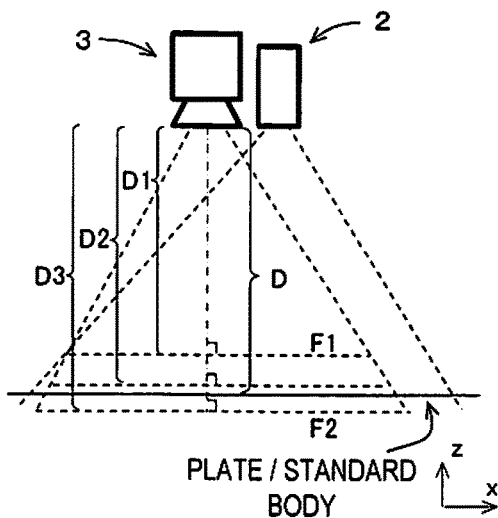
FIG. 3 is a simplified diagram of the positional relation between an illumination component and an imaging component with respect to an imaging object in calibration work.

FIG. 3 is a simplified diagram of the positional relation between the illumination component 2 and the imaging component 3 with respect to the imaging object in calibration work.

For example, a flat plate that has the same surface condition with the same material as the object to be inspected is prepared, and a standard phosphor for calibration work is affixed at various locations in the X and Y directions on the surface so that they can be imaged within the field of view of the imaging camera 32. This "standard phosphor" is configured to include a substance having fluorescence emission characteristics the same as or similar to those of the deposit S to be inspected, and is made up of a plurality of individual pieces which are separated into the same size and in the same surface condition.

Imaging is performed with the working distance D of the illumination component 2 and the imaging component 3 set at three different distances D1, D2, and D3 from the plate to which the standard phosphor is affixed, and images G1, G2, and G3 are acquired. The "working distance D" referred to here is the operating distance of the imaging camera 32, and means the distance from the lens 33 to the focus reference plane of the subject using the center of the imaging field of view (the so-called optical axis) as a reference. The distance D1 referred to here is the near focal length (the distance to the closest focal plane F I within the depth of field). The distance D3 is the far focal length (the distance to the farthest focal plane F2 within the depth of field). On the other hand, the distance D2 is the center focal length (that is, the center between the distance D1 and the distance D3).

Figure 4A:
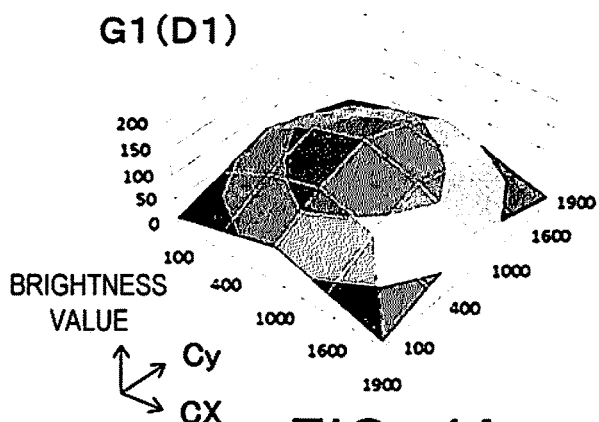
FIGS. 4A, 4B and 4C are distribution diagrams three-dimensionally showing the brightness distribution of images captured at different working distances D.
Figure 4B:
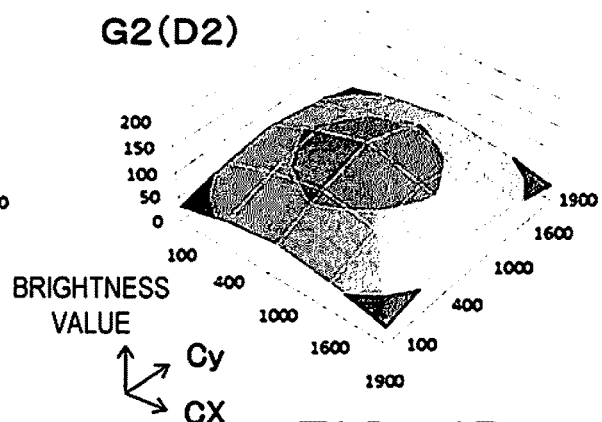
Figure 4C:
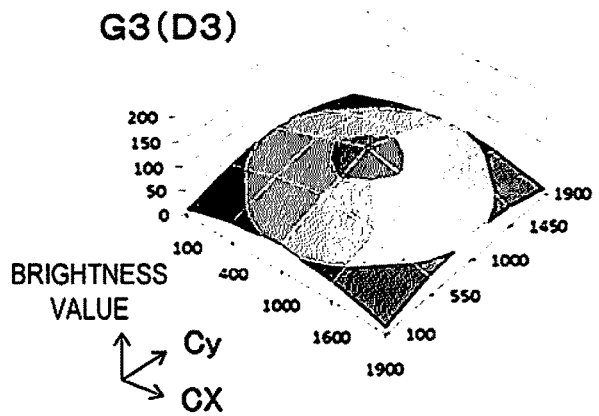

FIGS. 4A, 4B and 4C are distribution diagrams three-dimensionally showing the brightness distribution of images captured at different working distances D, and show the brightness distribution with respect to the position (Cx, Cy) within the field of view of the image. FIG. 4A is a distribution diagram three-dimensionally showing the brightness distribution of the image G1 at the distance D1. FIG. 4B is a distribution diagram three-dimensionally showing the brightness distribution of the image G2 at the distance D2. FIG. 4C is a distribution diagram three-dimensionally showing the brightness distribution of the image G3 at the distance D3.

In each of the images G1, G2, and G3, the brightness value increases as the working distance D gets closer to both the center portion and the peripheral portion of the imaging field of view, and the brightness value decreases moving farther away. Also, the brightness value is highest near the center portion of the imaging field of view, and the brightness value decreases as it spreads out to the peripheral portion.

Figure 5:
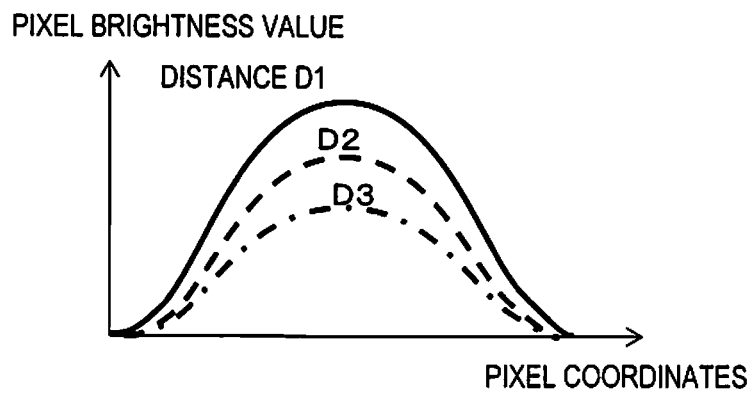
FIG. 5 is a diagram two-dimensionally showing the brightness distribution of images captured at different working distances D.

FIG. 5 is a diagram two-dimensionally showing the brightness distribution of images captured at different working distances D.

Between brightness measurement points at the distances D1, D2, and D3 (the sections indicated by a broken line in which the brightness is not measured), processing based on a continuous formula or continuous digitization is performed by linear interpolation, spline interpolation, or the like.

Figure 6:
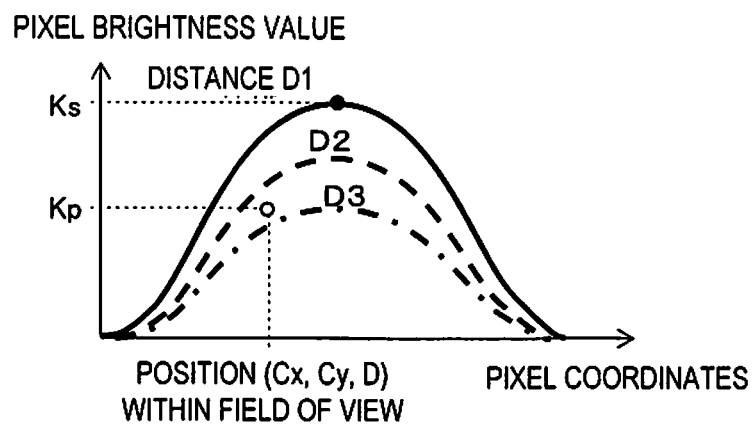
FIG. 6 is a conceptual diagram of calculation for finding a correction coefficient in an example of a mode for embodying the present invention.

FIG. 6 is a conceptual diagram of calculation for finding a correction coefficient in an example of a mode for embodying the present invention.

After performing processing based on a continuous formula or continuous digitization based on the brightness values at the distances D1, D2, and D3, processing is performed to find conversion information (formula or look-up table (LUT)) for calculating a brightness value at a given working distance D with respect to a given line-of-sight vector. This conversion information is treated as the shading correction information for a planar image captured by the imaging component 3 for each of a plurality of working distances according to the present invention, and is stored in the shading correction information registration component 6.

Using the conversion information obtained as described above, a correction coefficient K is calculated for each pixel of the image captured by the imaging component 3 and is stored in the shading correction information registration component 6.

The correction coefficient K can be calculated as follows. For example, the pixel brightness value Ks in the center of the image G1 at the distance D1 is acquired as a reference value for a correction coefficient. Then, the brightness value Kp at a position (Cx, Cy, D) within the field of view of the image at a given working distance D is acquired. Then, a correction coefficient K (Cx, Cy, D) corresponding to each position (Cx, Cy, D) within the field of view is calculated, using the ratio of these (Ks/Kp) as a correction coefficient K.

A specific procedure for performing three-dimensional shading correction using the correction coefficient K (Cx, Cy, D) corresponding to each position (Cx, Cy, D) within the field of view will now be described. The three-dimensional shading corrector 5 performs the following processing (1) to (3).

Processing (1) For each unit pixel of the captured image, the position (Cx, Cy) within the field of view and the brightness value Kp are acquired. The term "unit pixel" as used herein means a pixel or pixel group treated as the smallest unit in imaging and inspection, and may be a single pixel, or a plurality of pixels (such as 2×2 pixels or m×n pixels, where m and n are arbitrary integers) grouped together.

Processing (2) The working distance D to the inner wall surface of the container W at the position (Cx, Cy) of each unit pixel of the captured image within the field of view is acquired from the shape information about the container W in the inspection region R and the orientation information about the illumination component 2 and the imaging component 3 with respect to the inspection region R.

A configuration involving the use of a method called ray tracing will be given as an example of a means for acquiring the working distance D to the inner wall surface of the container W at the position (Cx, Cy) of each unit pixel of the captured image within the field of view.

More specifically, the position (Cx, Cy) within the field of view and the brightness value Kp are acquired for each unit pixel of the image acquired by the imaging component 3. A reference viewpoint V0 and a line-of-sight vector V are then obtained by conversion based on the position (Cx, Cy) of each unit pixel of the captured image within the field of view and the orientation information about the imaging component 3 with respect to the inspection region R. The working distance D to the inner wall surface of the container W corresponding to the position (Cx, Cy) of each unit pixel of the captured image within the field of view is then calculated from the viewpoint V0, the line-of-sight vector V, and the shape information about the container W in the inspection region R. The working distance D to the inner wall surface of the container W corresponding to the position (Cx, Cy)

within the field of view is calculated for each unit pixel of the image acquired by the imaging component 3.

Processing (3) The correction coefficient K (Cx, Cy, D) corresponding to each position (Cx, Cy, D) within the field of view is calculated based on the working distance D to the inner wall surface of the container W corresponding to the position (Cx, Cy) of each unit pixel within the field of view that has been calculated and obtained in the above processing (2).

In this manner, the three-dimensional shading corrector 5 can output an image that has undergone three-dimensional shading correction, by multiplying the correction coefficient K (Cx, Cy, D) corresponding to the position information (Cx, Cy, D) within the field of view and the brightness value Kp for each unit pixel of the image captured by the imaging component 3, to calculate a brightness value Kp' that has undergone three-dimensional shading correction.

The deposit inspection component 7 inspects the deposits adhering to the surface of the container W in which the inspection region R has been set, based on the image that has undergone three-dimensional shading correction by the three-dimensional shading corrector 5. More specifically, the deposit inspection component 7 further performs image processing on the image processed by the three-dimensional shading corrector 5, and is constituted by an image processing device (hardware) and its execution program (software) incorporated into the computer CN provided to the three-dimensional object inspecting device 1.

Even more specifically, the deposit inspection component 7 uses information about the brightness value Kp' after three-dimensional shading correction, including the working distance D, extracts the characteristic region included in the image, and performs an inspection assuming that the deposit S, which is an object to be inspected, is adhering in this characteristic region. The "characteristic region" referred to here means, for example, a region flecked with white or light gray, against a background image that is black or dark gray. Alternatively, the characteristic region may be a region flecked with black or dark gray, against a background image that is white or light gray. A threshold is set in advance using the brightness difference between the characteristic region and the background image as a reference, and the characteristic region is extracted by extracting a region brighter or darker than this threshold for the corrected image.

Since the three-dimensional object inspecting device 1 pertaining to the present invention is configured in this way, it can perform an inspection by performing the three-dimensional shading correction on the captured image based on the orientation information (working distance and inclination angle) of the illumination component 2 and the imaging component 3 even when the deposit S has adhered to the inner wall surface of the container W whose distance and orientation with respect to the illumination component 2 and the imaging component 3 vary every time imaging is performed. More specifically, the three-dimensional object inspecting device 1 pertaining to the present invention can carry out inspections to determine which part of the container W the deposit S is adhering to (determine the attachment location), to count the number or measure the size of the deposit S adhering to the container W, and so forth.

Other Mode

The three-dimensional object inspecting device pertaining to the present invention may be configured to comprise a conversion information registration component 8 and a deposited amount calculator 9 in addition to the above-mentioned three-dimensional object inspecting device 1.

The conversion information registration component 8 is used to register conversion information based on the correlation between the deposited amount and brightness information. More specifically, the conversion information registration component 8 registers conversion information based on the correlation between the brightness value per unit pixel of the captured image and the deposited amount of the deposit S adhering to the inspection portion corresponding to that unit pixel. Even more specifically, the conversion information registration component 8 is constituted by a storage device of the computer component CN provided to the three-dimensional object inspecting device 1.

The deposited amount calculator 9 makes up part of the deposit inspection component 7, and is used to calculate the amount of deposit adhering to the surface of the three-dimensional object based on brightness information that has undergone three-dimensional shading correction by the three-dimensional shading corrector 5 and conversion information correlated with this brightness information that has undergone three-dimensional shading correction. More specifically, the deposited amount calculator 9 multiplies the above-mentioned conversion information by the brightness value per unit pixel for each of the unit pixels of the captured image, calculates the deposited amount of the deposit S adhering to the inspection portion corresponding to that unit pixel, and finds the sum of these to calculate the amount of deposit adhering to the inner faces of the container W.

Because of this configuration, the above-mentioned three-dimensional object inspecting device can calculate the amount of deposit S adhering to the container W.

Other Mode

In the above description, an example was given of a configuration comprising the shading correction information registration component 6, which registers the shape information about the three-dimensional object in the inspection region R, the orientation information about the illumination component 2 and the imaging component 3 with respect to the inspection region R, and three-dimensional shading correction information for that orientation, that have been predefined.

However, in embodying the present invention, the shading correction information registration component 6 is not limited to such a configuration, and may be configured to register only the three-dimensional shading correction information. In this case, the shape information about the three-dimensional object in the inspection region R and the orientation information about the illumination component 2 and the imaging component 3 with respect to the inspection region R are acquired from the outside. For example, if the position (Cx, Cy) within the field of view of the captured image and the working distance D corresponding to that position (Cx, Cy) within the field of view can be acquired or calculated for the deposit S, it is not necessary to register the shape information about the three-dimensional object or to acquire it from the outside in advance, and the present invention can be embodied by a configuration in which this information is acquired or calculated each time.

Alternatively, even if the working distance D corresponding to the position (Cx, Cy) within the field of view of the captured image cannot be acquired directly, the present invention can be embodied by using a technique called focus determination, focus evaluation, etc., to acquire or calculate distance information to the focal position. More specifically, the configuration may be such that a plurality of images with different working distances D are captured with respect to a single inspection region R, and distance information is acquired or calculated for each position (Cx, Cy) within the field of view of the captured image. Alternatively, the configuration may be such that an image is captured from two directions with respect to a single inspection region R with a stereo camera method, and distance information is acquired or calculated for each position (Cx, Cy) within the field of view of the captured images.

When the Container is Set in a Different Position

Every time the container W is set on the container holding table B3 of the position angle adjusting mechanism RB, there may be deviation in the set position and orientation. Considering that such deviation may occur, there is a configuration comprising a sensor (not shown) for measuring the set position and inclination of the container W, the distance to the side plates, and the like, in which the position and orientation of the container W are ascertained by the sensor. The above-mentioned deviation is then corrected for the orientation information about the illumination component 2 and the imaging component 3 with respect to the inspection region R at the time of imaging, acquired by the orientation information acquisition component 4. This allows the present invention to be applied and the proper inspection to be performed even if there is deviation in the set position and orientation of the container W.

Container Shape Information

If there are a plurality of containers to be inspected and there are individual differences in their shapes, then shape information is obtained in advance for each container. On the other hand, if it can be considered that the inspection result will not be affected if the containers are considered as having all the same shape, then shape information about a typical container is obtained in advance.

Also, shape information about the container may be registered in the storage device of the computer CN, or may be acquired from the outside by data communication or the like.

Illumination Component

In the above description, the excitation light illumination unit 20 comprising an LED that emits ultraviolet rays as a light source was given as an example of the illumination component 2. Also, a configuration comprising the imaging camera 32, the lens 33, and the fluorescent light observation filter 34 (a configuration for performing inspection based on a fluorescent light image) was given as an example of the imaging component 3. With such a configuration, in inspecting a deposit, imaging is performed while preventing halation caused by capturing the excitation light 23, and an inspection based on the captured image is performed, so the presence or absence of deposits, the accurate size and number of the deposits, the adhering amount, and so forth can be ascertained.

However, the present invention is not limited to inspection based on a fluorescent light image. As long as imaging can be performed in a state in which no halation is caused by the illumination light, the present invention can also be applied to a mode in which white light is emitted from the illumination component 2, the white light is captured by the imaging component 3, and inspection is performed based on the acquired image. For example, if the container W is made of a material having low light reflectance, or of a material that has undergone a surface treatment to prevent the reflection of light (a surface treatment that provides fine bumps, an anti-reflection coating, etc.), and the scattered light from the deposit is strong enough to ensure a good contrast of the light on the deposit against the background, then inspection can be performed to ascertain the presence or absence of deposits, their size and number, and so forth.

In this case, instead of the above-mentioned standard phosphor (constituted to include a substance having fluorescent light emission characteristics that are the same as or similar to those of the deposit S to be inspected), a configuration is used that includes a substance having scattering or reflection characteristics that are the same as or similar to those of the deposit S to be inspected.

Other Mode

In the above description, a mode of measuring the amount of deposit S adhering to the inner face of the container W was described in detail as an example of inspection.

However, the three-dimensional object inspecting device pertaining to the present invention can be applied not only to the measurement of the amount of deposit, but also to determining the presence or absence of a deposit and the size and number thereof (so-called foreign matter inspection). Also, the three-dimensional object inspecting device pertaining to the present invention can be applied not only to foreign matter inspection, but also to other kinds of inspection such as circuit pattern inspection, unevenness inspection, etc. In this case, the configuration may be such that excitation light is emitted toward the inspection region R and the emitted fluorescent light is captured, or the configuration may be such that white light is emitted toward the inspection region R and scattered or reflected light is captured. In this case, the standard phosphor (or the standard body) is a substance having fluorescent light emission characteristics that are the same as or similar to those of the deposit S to be inspected (a substance having scattering or reflection characteristics that are the same as or similar to those of the deposit S to be inspected).

Other Mode

In the above description, a configuration comprising the illumination component 2 and the imaging component 3 was given as an example, but instead of the illumination component 2, a light source that emits light energy toward an inspection region set for the three-dimensional object may be provided, and instead of the imaging component 3, a detector that detects radiant energy radiated from the inspection region may be provided.

The light source referred to here is one that emits light energy, and the present invention can also be applied when energy is converted on the surface or inside of the object to be inspected and radiated as heterogeneous radiant energy (such as heat, sound, or electromagnetic waves).

In this case, the detector is appropriately selected so that it will detect heterogeneous radiant energy radiated after energy conversion on the surface or inside of the object to be inspected (a thermopile, a microphone, a photodiode, a semiconductor detector, etc.).

Standard Body/Standard Phosphor

In the above description, an example was given in which the standard phosphor (or standard body) included a substance having scattering or reflection characteristics the same as or similar to those of the deposit S to be inspected (or a substance having fluorescent light emission characteristics the same as or similar to those of the deposit S to be inspected), and was made up of a plurality of individual pieces having the same surface condition and the same size, and an example was given of imaging at the same time. With such a configuration, calibration work takes less time.

However, the standard body (including a standard phosphor; the same applies hereinafter) is not limited to such a configuration, and it may be something in the form of a plate having a surface area large enough to cover the entire field of view of the imaging camera 32. This is preferable because continuous distribution data of brightness values in the XY plane can be acquired from the captured image.

Alternatively, the standard body may be made up of just one small piece. In this case, the location where the standard body is disposed may be changed, imaging may be performed each time the location is changed, and the brightness value of the standard body at each imaging position may be acquired. It takes longer to calibrate using one standard body, but a plurality of standard bodies do not have to be used, and there is no influence due to individual differences.

Split Imaging

In the above description, a mode in which the inspection region R set for part of the side faces and part of the bottom face of the container W were imaged at the same time was given as an example. In this case, imaging is performed by dividing the inside of one of the side faces constituting the container W into three sections, namely, upper, middle, and lower, imaging the bottom face simultaneously with the lower section of the side face, and imaging the top face simultaneously with the upper section of the side face. Also, the images captured by divided imaging are superimposed. At this point, any overlapping portions (that is, portions that overlap in a plurality of image captures) are eliminated by masking one so that just one of the images is left, or a plurality of images are subjected to averaging processing or the like. The results are treated as organized images for the side faces, the top face, and the bottom face, or as an image in which the inner faces of the container W have been developed, and where deposits adhere to these faces, the total amount of the deposits, and so forth are outputted as inspection results.

Three-Dimensional Shape

In the above description, a container W having a substantially cuboid shape was given as an example of a three-dimensional object, and a mode in which the inner faces (that is, the inner wall faces) of the container W were inspected by using the three-dimensional object inspecting device 1 was given as an example.

However, the three-dimensional object inspecting device pertaining to the present invention can also be applied to a mode in which the outer wall faces of the container W are inspected. Also, the three-dimensional object is not limited to being the container W having a bottom face, and may instead be a cylindrical object having no bottom face, and the present invention can also be applied to a mode in which the inside or the outside of the wall faces of this cylindrical object are inspected. Furthermore, the three-dimensional object may be an object having a three-dimensional shape and comprises wall faces that are stepped, corrugated, substantially L-shaped, arc-shaped, or semicircular in shape and not continuous in the circumferential direction.

The invention claimed is:

1. A three-dimensional object inspecting device for inspecting a three-dimensional object, the three-dimensional object inspecting device comprising:
   a light source configured to emit light energy toward an inspection region set for the three-dimensional object;
   a detector configured to detect radiant energy radiated from the inspection region;
   an orientation information acquisition component configured to acquire orientation information about the light source and the detector with respect to the inspection region;
   a three-dimensional shading corrector configured to perform three-dimensional shading correction on information corresponding to the radiant energy detected by the detector, based on shape information about the three-dimensional object in the inspection region, the orientation information about the light source and the detector with respect to the inspection region, and shading correction information for a planar image detected by the detector for each of a plurality of working distances; and
   an inspection component configured to perform an inspection based on the information on which the three-dimensional shading correction has been performed.

2. A three-dimensional object inspecting device for inspecting a deposit attached to a surface of a three-dimensional object, the three-dimensional object inspecting device comprising:
   a light source configured to emit light energy toward an inspection region set for the three-dimensional object;
   a detector configured to detect radiant energy radiated from the deposit in the inspection region;
   an orientation information acquisition component configured to acquire orientation information about the light source and the detector with respect to the inspection region;
   a three-dimensional shading corrector configured to perform three-dimensional shading correction on information corresponding to the radiant energy detected by the detector, based on shape information about the three-dimensional object in the inspection region, orientation information about the light source and the detector with respect to the inspection region, and shading correction information for a planar image detected by the detector for each of a plurality of working distances; and
   a deposit inspection component configured to perform an inspection of the deposit based on the information on which the three-dimensional shading correction has been performed.

3. The three-dimensional object inspecting device according to claim 2, further comprising
   a conversion information registration component configured to register conversion information based on a correlation between a deposited amount and brightness information, and
   a deposited amount calculator configured to calculate a deposited amount of the deposit based on the conversion information and brightness information on which the three-dimensional shading correction has been performed by the three-dimensional shading corrector.

4. The three-dimensional object inspecting device according to claim 2, wherein
   the light source includes an illumination component configured to emit illumination light toward the inspection region set on the surface of the three-dimensional object as the light energy,
   the detector includes an imaging component configured to capture light radiated from the deposit in the inspection region as the radiant energy,
   the orientation information acquisition component is configured to acquire the orientation information about the illumination component and the imaging component with respect to the inspection region,
   the three-dimensional shading corrector is configured to perform the three-dimensional shading correction on an image captured by the imaging component, based on the shape information about the three-dimensional object in the inspection region, the orientation information about the illumination component and the imaging component with respect to the inspection region, and the shading correction information for the planar image captured by the imaging component for each of the plurality of working distances, and the deposit inspection component is configured to perform the inspection of the deposit based on the image on which the three-dimensional shading correction has been performed.

5. The three-dimensional object inspecting device according to claim 4, further comprising a conversion information registration component configured to register conversion information based on a correlation between a deposited amount and brightness information, the deposit inspection component including a deposited amount calculator configured to calculate a deposited amount of the deposit based on brightness information on which the three-dimensional shading correction has been performed by the three-dimensional shading corrector and the conversion information.

6. The three-dimensional object inspecting device according to claim 4, further comprising a shading correction information registration component configured to register orientation information about the illumination component and the imaging component with respect to the inspection region and shading correction information for orientation of the illumination component and the imaging component with respect to the inspection region.

7. The three-dimensional object inspecting device according to claim 4, wherein the illumination component is configured to emit excitation light for causing the deposit to emit fluorescent light, the imaging component is configured to capture the fluorescent light emitted from the deposit, the shading correction information is distribution information about a brightness correction coefficient calculated based on position information about a plurality of standard fluorescent bodies affixed in advance to a surface of an object and brightness value information about brightness value of the fluorescent light radiated from the standard fluorescent bodies, and the standard fluorescent bodies have a fluorescent light emission characteristic correlated with that of the deposit.

8. The three-dimensional object inspecting device according to claim 2, further comprising a shading correction information registration component configured to register the shading correction information for the planar image captured by the detector for each of the plurality of working distances.

9. The three-dimensional object inspecting device according to claim 2, wherein the shading correction information is distribution information about a radiant energy correction coefficient calculated based on position information about a plurality of standard samples affixed in advance to a surface of an object and radiant energy information about detection values of the radiant energy radiated from the standard samples.

10. The three-dimensional object inspecting device according to claim 1, further comprising a shading correction information registration component configured to register the shading correction information for the planar image captured by the detector for each of the plurality of working distances.

11. The three-dimensional object inspecting device according to claim 1, wherein the shading correction information is distribution information about a radiant energy correction coefficient calculated based on position information about a plurality of standard samples affixed in advance to a surface of an object and radiant energy information about detection values of the radiant energy radiated from the standard samples.

12. The three-dimensional object inspecting device according to claim 1, wherein the light source includes an illumination component configured to emit illumination light toward the inspection region as the light energy, the detector includes an imaging component configured to capture light radiated from the inspection region as the radiant energy;

the orientation information acquisition component is configured to acquire the orientation information about the illumination component and the imaging component with respect to the inspection region, the three-dimensional shading corrector is configured to perform the three-dimensional shading correction on an image captured by the imaging component, based on the shape information about the three-dimensional object in the inspection region, the orientation information about the illumination component and the imaging component with respect to the inspection region, and the shading correction information for the planar image captured by the imaging component for each of the plurality of working distances, and the inspection component is configured to perform the inspection based on the image on which the three-dimensional shading correction has been performed.

13. The three-dimensional object inspecting device according to claim 12, further comprising a shading correction information registration component configured to register orientation information about the illumination component and the imaging component with respect to the inspection region and shading correction information for orientation of the illumination component and the imaging component with respect to the inspection region.

14. The three-dimensional object inspecting device according to claim 12, wherein the illumination component is configured to emit excitation light for causing the deposit to emit fluorescent light, the imaging component is configured to capture the fluorescent light emitted from the deposit, the shading correction information is distribution information about a brightness correction coefficient calculated based on position information about a plurality of standard fluorescent bodies affixed in advance to a surface of an object and brightness value information about brightness value of the fluorescent light radiated from the standard fluorescent bodies, and the standard fluorescent bodies have a fluorescent light emission characteristic correlated with that of the deposit.

\* \* \* \* \*